(12) United States Patent
Lin et al.

(10) Patent No.: US 11,865,553 B2
(45) Date of Patent: Jan. 9, 2024

(54) MOVABLE HOLDER AND SHOWER ASSEMBLY

(71) Applicant: FUJIAN XIHE SANITARY WARE TECHNOLOGY CO., LTD, Fujian (CN)

(72) Inventors: Xiaofa Lin, Fujian (CN); Xiaoshan Lin, Fujian (CN); Zhennan Chen, Fujian (CN); Haibo Du, Fujian (CN); Shengtao Shu, Fujian (CN); Xiaoqing Deng, Fujian (CN); Qiqiao Liu, Fujian (CN)

(73) Assignee: FUJIAN XIHE SANITARY WARE TECHNOLOGY CO., LTD, Fujian (CN)

( * ) Notice: Subject to any disclaimer, the term of this patent is extended or adjusted under 35 U.S.C. 154(b) by 331 days.

(21) Appl. No.: 17/430,217

(22) PCT Filed: Dec. 15, 2020

(86) PCT No.: PCT/CN2020/136463
§ 371 (c)(1),
(2) Date: Aug. 11, 2021

(87) PCT Pub. No.: WO2022/082969
PCT Pub. Date: Apr. 28, 2022

(65) Prior Publication Data
US 2022/0305513 A1    Sep. 29, 2022

(30) Foreign Application Priority Data

Oct. 21, 2020 (CN) ............................ 202011134510

(51) Int. Cl.
*B05B 15/68* (2018.01)
*E03C 1/04* (2006.01)
*F16L 37/084* (2006.01)

(52) U.S. Cl.
CPC ............ *B05B 15/68* (2018.02); *E03C 1/0408* (2013.01); *F16L 37/0847* (2013.01); *E03C 2001/0414* (2013.01)

(58) Field of Classification Search
CPC .......... E03C 1/0408; E03C 1/06; B05B 15/68
See application file for complete search history.

(56) References Cited

U.S. PATENT DOCUMENTS

2018/0282983 A1* 10/2018 Lin ......................... E03C 1/023

FOREIGN PATENT DOCUMENTS

| CN | 203417805 U | 2/2014 |
|----|-------------|--------|
| CN | 203425971 U | 2/2014 |

(Continued)

OTHER PUBLICATIONS

First Office Action for Chinese Application No. 202011134510.X, dated May 8, 2021, 12 Pages.

(Continued)

*Primary Examiner* — Christine J Skubinna
(74) *Attorney, Agent, or Firm* — BROOKS KUSHMAN P.C.

(57) ABSTRACT

A movable holder includes a showerhead seat assembly; a mounting frame having a first receiving groove, the showerhead seat assembly being rotatably mounted on the mounting frame, a mating boss being provided on the mounting frame, and a locking member being mounted on the mating boss; a transmission seat movably mounted in the first receiving groove, a limiting structure being provided between the mounting frame and the transmission seat; and a damping member sleeved with the transmission seat by an interference fit and in a relatively rotatable manner and rotated synchronously with the showerhead seat assembly, an elastic member being pressed between the damping member and the showerhead seat assembly. The transmis- (Continued)

sion seat is configured to drive, along with the rotation of the damping member, the locking member to move between a locked position and an unlocked position. A shower assembly includes the movable holder.

20 Claims, 8 Drawing Sheets

(56) References Cited

FOREIGN PATENT DOCUMENTS

| | | |
|---|---|---|
| CN | 204781145 U | 11/2015 |
| CN | 204826082 U | 12/2015 |
| CN | 204898790 U | 12/2015 |
| CN | 207005352 U | 2/2018 |
| CN | 207376720 U | 5/2018 |
| CN | 109162321 A | 1/2019 |
| CN | 110038760 A | 7/2019 |
| CN | 110042888 A | 7/2019 |
| CN | 209457093 U | 10/2019 |
| CN | 210411312 U | 4/2020 |
| CN | 211113913 U | 7/2020 |
| JP | 2001173049 A | 6/2001 |
| JP | 2002212991 A | 7/2002 |
| JP | 2008267054 A | 11/2008 |
| KR | 1020170116695 A | 10/2017 |

OTHER PUBLICATIONS

International Search Report and Written Opinion for Application No. PCT/CN2020/136463, dated Oct. 21, 2020, 11 Pages.

* cited by examiner

MOVABLE HOLDER AND SHOWER ASSEMBLY

CROSS-REFERENCE TO RELATED APPLICATIONS

This application is the U.S. national phase of PCT Application No. PCT/CN2020/136463 filed on Dec. 15, 2020, which claims priority to Chinese Patent Application No. 202011134510.X filed on Oct. 21, 2020, which are incorporated herein by reference in their entireties.

TECHNICAL FIELD

Embodiments of the present disclosure relate to, but are not limited to, the field of kitchen and sanitation technology, in particular to a movable holder and a shower assembly.

BACKGROUND

In some technologies, the function of lifting adjustment of a movable holder and the function of showerhead angle adjustment of a shower assembly are accomplished respectively by two separate mechanisms, and the two mechanisms both have a relatively complex structure.

SUMMARY

The following is a summary of the subject matter described in detail herein. This summary is not intended to limit the protection scope of the claims.

An embodiment of the present disclosure provides a movable holder, which realizes two functions of lifting adjustment and showerhead angle adjustment by the same mechanism, and has better practicability.

An embodiment of the present disclosure further provides a shower assembly.

The movable holder provided by an embodiment of the present disclosure includes: a showerhead seat assembly; a mounting frame having a first receiving groove, the showerhead seat assembly being rotatably mounted on the mounting frame, a mating boss being provided on the mounting frame, and a locking member being mounted on the mating boss; a transmission seat movably mounted in the first receiving groove, a limiting structure being provided between the mounting frame and the transmission seat; and a damping member sleeved with the transmission seat in a relatively rotatable manner and rotated synchronously with the showerhead seat assembly, and an elastic member being pressed between the damping member and the showerhead seat assembly. The transmission seat is configured to drive, along with the rotation of the damping member, the locking member to move between a locked position and an unlocked position, the transmission seat is restricted by the limiting structure to be rotatable only within a preset angle range, and the damping member is rotated relative to the transmission seat when rotating beyond the preset angle range.

In an exemplary embodiment, the movable holder further includes: a first transmission structure provided between the mounting frame and the transmission seat, and a second transmission structure provided between the locking member and the transmission seat, the damping member being movably mounted on the showerhead seat assembly. The first transmission structure is configured to drive the transmission seat to move towards or away from the showerhead seat assembly when the transmission seat rotates with the damping member, and the second transmission structure is configured to drive the locking member to move between the locked position and the unlocked position when the transmission seat moves towards or away from the showerhead seat assembly.

In an exemplary embodiment, limiting ribs are provided on an inner side surface of the first receiving groove at intervals in a circumferential direction, a convex rib is provided on a side surface of the transmission seat, the convex rib is limited between the limiting ribs, and the limiting structure includes the limiting ribs.

In an exemplary embodiment, a convex rib is provided on a side surface of the transmission seat, a first mating surface inclined relative to a circumferential direction is provided on an inner side surface of the first receiving groove, the first mating surface faces an opening end of the first receiving groove, the convex rib abuts against the first mating surface, the first transmission structure includes the convex rib and the first mating surface; when the convex rib rotates from a lower end of the first mating surface to a higher end of the first mating surface, the transmission seat moves towards the showerhead seat assembly; and when the convex rib rotates from the higher end of the first mating surface to the lower end of the first mating surface, the transmission seat moves away from the showerhead seat assembly.

In an exemplary embodiment, the movable holder further includes a transmission shaft, a through receiving hole is provided on the mating boss, the locking member and the transmission shaft are both located in the receiving hole, one end of the transmission shaft is mated with the locking member, and the other end of the transmission shaft extends into the first receiving groove to be mated with the transmission seat, and the second transmission structure includes the transmission shaft.

In an exemplary embodiment, the mating boss is convexly disposed on an end surface of the mounting frame facing away from the showerhead seat assembly; when the transmission seat moves away from the showerhead seat assembly, an end surface of the transmission seat facing away from the showerhead seat assembly pushes the transmission shaft, and the transmission shaft pushes the locking member to move to the locked position; and when the transmission seat moves towards the showerhead seat assembly, the end surface of the transmission seat facing away from the showerhead seat assembly releases the transmission shaft, the transmission shaft releases the locking member, and the locking member moves to the unlocked position.

In an exemplary embodiment, the mating boss is convexly disposed on an outer side surface of the mounting frame, a second mating surface inclined relative to an axial direction is provided on a side surface of the transmission seat, the second mating surface faces an inner side surface of the first receiving groove, and the second transmission structure further includes the second mating surface; and when the transmission seat moves towards or away from the showerhead seat assembly, the second mating surface pushes or releases the transmission shaft.

In an exemplary embodiment, the movable holder further includes a roller rotatably mounted on the mating boss and configured to realize a rolling fit between the mating boss and a guide rail groove used in cooperation with the mating boss.

In an exemplary embodiment, a receiving hole is provided on the mating boss, a socket is provided on a side wall of the receiving hole, a transmission shaft is disposed in the receiving hole, and the roller is mounted into the receiving hole through the socket and rotatably sleeved on the transmission shaft.

In an exemplary embodiment, the movable holder further includes a support located in the first receiving groove, the elastic member is pressed between the support and the showerhead seat assembly, the damping member is fixedly mounted on the support, and the transmission seat is rotatably covered and mounted on the damping member in an interference fit.

In an exemplary embodiment, a guiding and positioning hole is provided on an end surface of the support facing the showerhead seat assembly, and a guiding and positioning upright rib is convexly provided on the showerhead seat assembly, the guiding and positioning upright rib is inserted into the guiding and positioning hole.

In an exemplary embodiment, through holes are provided in center portions of the transmission seat, the damping member and the support, a stud is convexly provided on the showerhead seat assembly, the stud extends into the through holes, and a screw passes through a top wall of the first receiving groove to be screwed on the stud.

In an exemplary embodiment, a second receiving groove is provided on the showerhead seat assembly, and the mounting frame is mounted in the second receiving groove in a sinking manner.

In an exemplary embodiment, the mating boss is a T-shaped mating boss, and there are a plurality of sets of T-shaped mating bosses and locking members arranged at intervals in the same row.

In an exemplary embodiment, the showerhead seat assembly includes a showerhead seat and a rotatable cover, the rotatable cover is rotatably mounted on the mounting frame, and the showerhead seat is mounted on the rotatable cover.

Optionally, the damping member is a rubber roller.

The shower assembly provided by an embodiment of the present disclosure includes the movable holder described in any of the above embodiments.

For the movable holder provided by an embodiment of the present disclosure, the two functions, i.e., lifting adjustment and showerhead angle adjustment, are realized by the same mechanism, thus achieving better practicability.

Other features and advantages of embodiments of the present disclosure will be set forth in the description which follows, and in part will be obvious from the description, or may be learned by practice of embodiments of the present disclosure. The objects and other advantages of the embodiments of the present disclosure can be realized and obtained by the structures particularly indicated in the description and drawings.

Other aspects will become apparent after reading and understanding the drawings and detailed description.

BRIEF DESCRIPTION OF DRAWINGS

The accompanying drawings are used to provide a further understanding of the technical schemes of the embodiments of the present disclosure, and constitute a part of the specification. They are used together with the embodiments of the present application to explain the technical schemes of the present disclosure, and do not constitute a restriction on the technical schemes of the embodiments of the present disclosure.

The correspondence between reference signs and component names in FIGS. 1-8 is as follows:

100—showerhead seat assembly, 110—showerhead seat, 111—arc-shaped wall, 112—mounting plate, 113—engaging hook, 120—rotatable cover, 121—second receiving groove, 122—stud, 123—guiding and positioning upright rib, 124—first through groove, 125—engaging hole, 200—mounting frame, 201—first receiving groove, 202—connecting hook, 203—mating boss, 204—receiving hole, 205—socket, 206—guide hole, 207—penetrating hole, 208—first mating surface, 209—limiting rib, 210—transmission shaft, 220—roller, 230—locking member, 231—guide post, 300—transmission assembly, 310—transmission seat, 311—first through hole, 312—convex rib, 313—toothed groove, 320—rubber roller, 321—second through hole, 322—damping rib, 323—engaging groove, 330—support, 331—third through hole, 332—engaging tooth, 340—elastic member.

DETAILED DESCRIPTION

Hereinafter, embodiments of the present disclosure will be described in detail with reference to the accompanying drawings. The embodiments in the present application and the features in the embodiments may be combined with each other arbitrarily if there is no conflict.

Embodiment 1

As shown in FIGS. 1-5, a movable holder provided by Embodiment 1 of the present application includes a showerhead seat assembly 100, a mounting frame 200 and a transmission assembly 300 which are assembled together.

Figure 1:
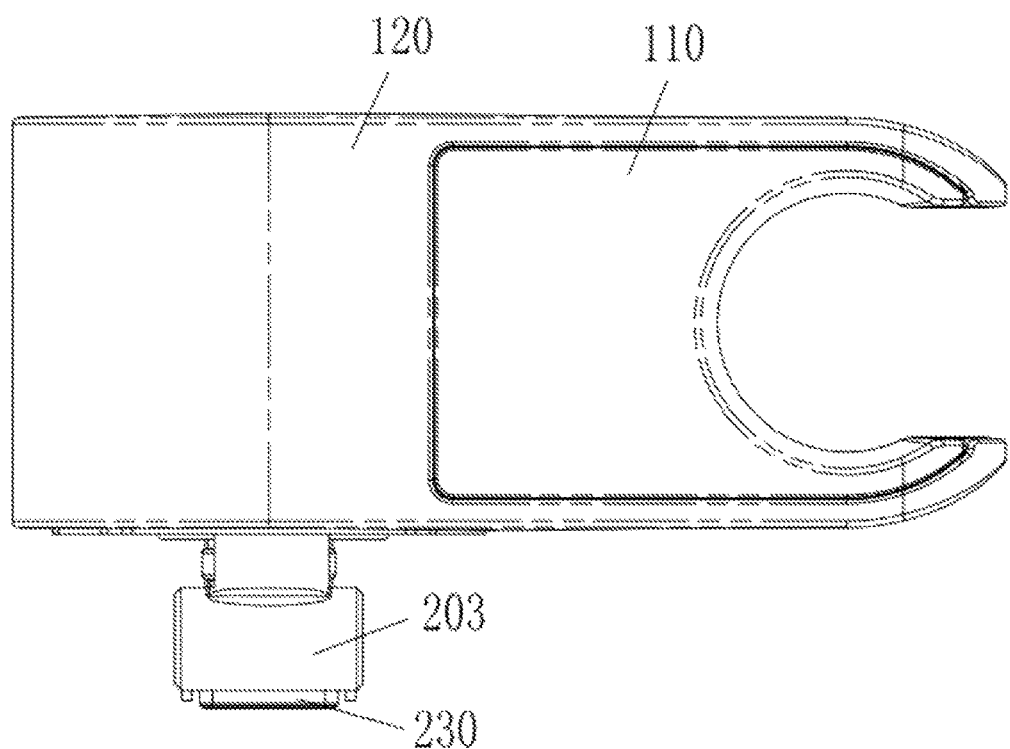
FIG. 1 is a schematic top view of a structure of a movable holder according to Embodiment 1 of the present disclosure.
Figure 2:
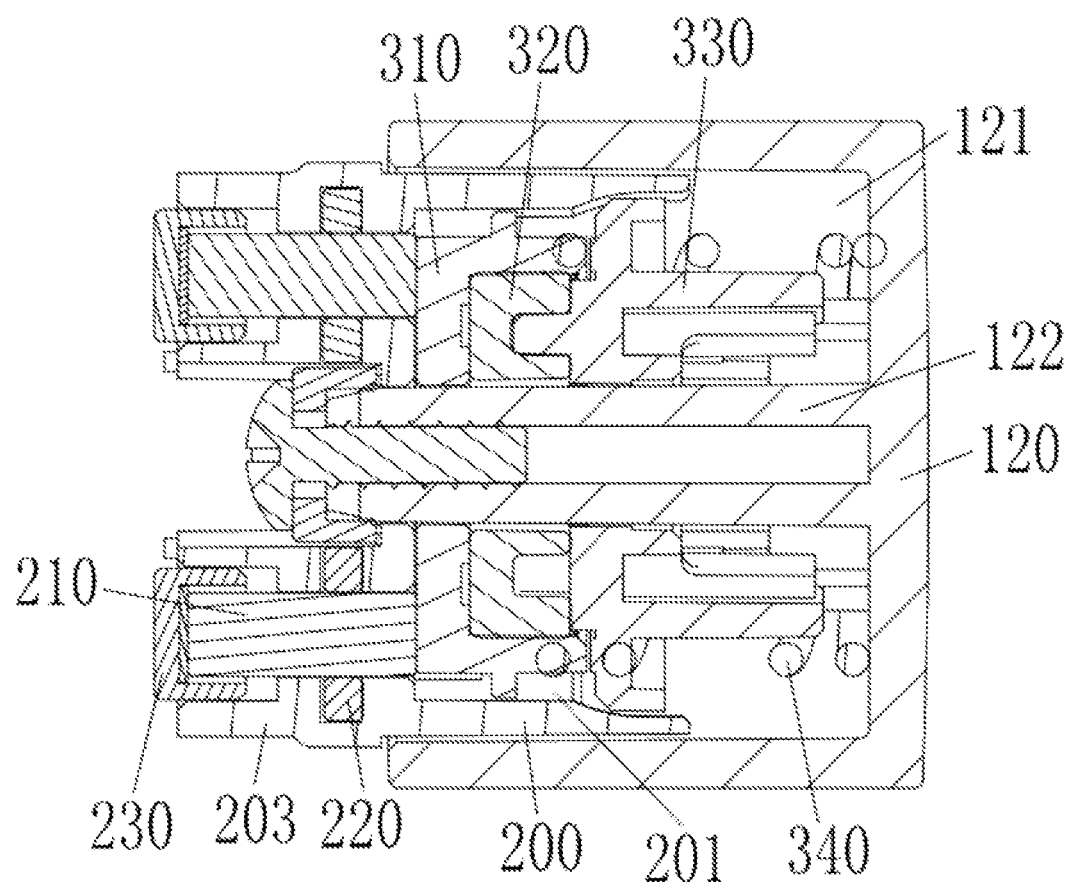
FIG. 2 is a schematic right sectional view of a structure of the movable holder shown in FIG. 1.
Figure 3:
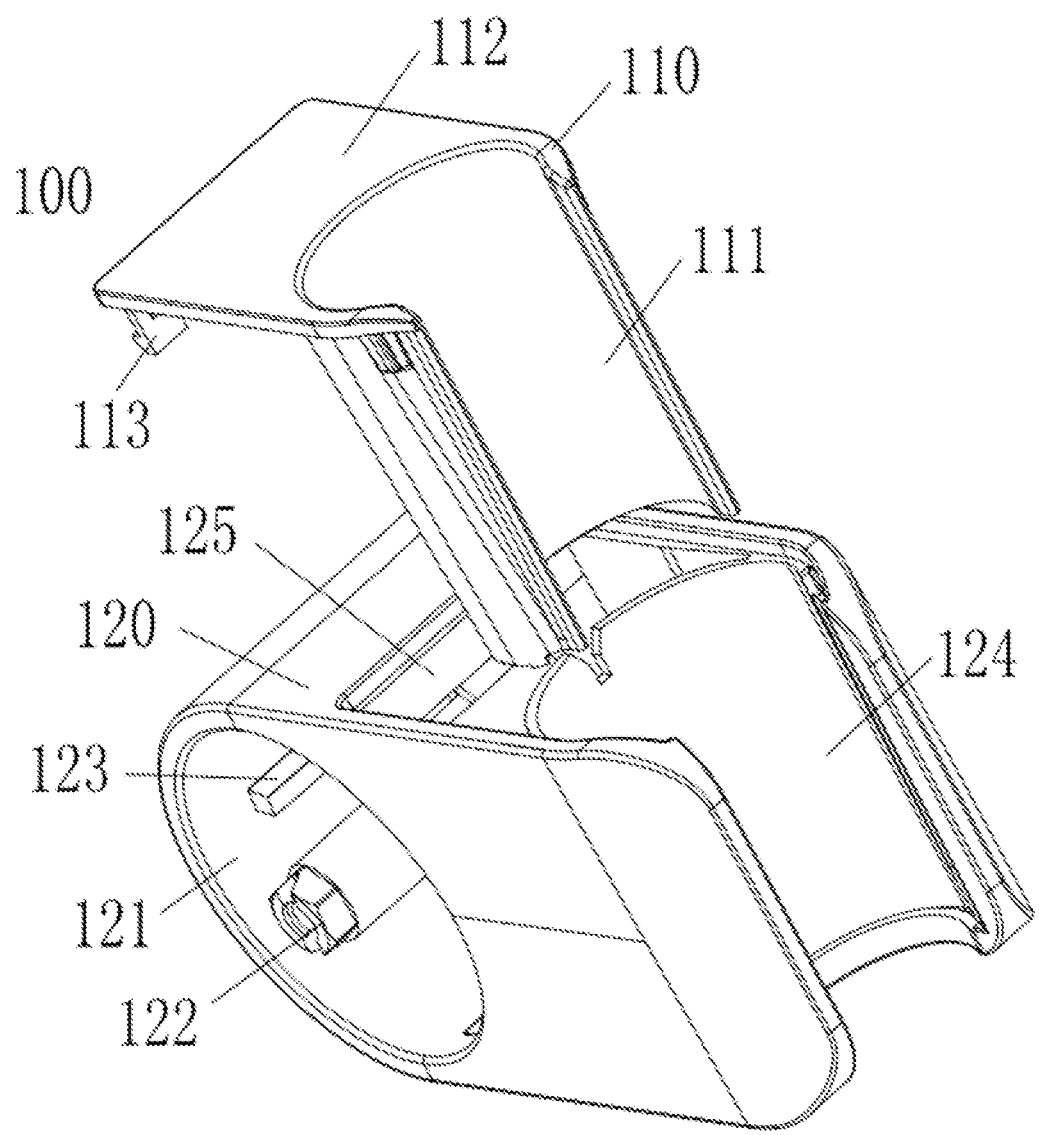
FIGS. 3 to 5 are schematic exploded views of a structure of the movable holder shown in FIG. 1.

The showerhead seat assembly 100:

As shown in FIG. 3, the showerhead seat assembly 100 may include a showerhead seat 110 and a rotatable cover 120.

As shown in FIG. 3, a front portion of the showerhead seat 110 may be provided with an arc-shaped wall 111 extending downwardly, an upper end of a rear portion of the showerhead seat 110 may be provided with a mounting plate 112 extending backwardly, and the mounting plate 112 may be provided with an engaging hook 113.

As shown in FIG. 3, a second receiving groove 121 may be provided on a side surface of the rotatable cover 120, a stud 122 may be convexly provided on a center portion of the inner bottom surface of the second receiving groove 121, a guiding and positioning upright rib 123 may be convexly provided beside the stud 122, one end of the rotatable cover 120 may be provided with a first through groove 124 for receiving the showerhead seat 110, and an upper end surface of the rotatable cover 120 may be provided with an engaging hole 125.

When the showerhead seat 110 is received in the first through groove 124 of the rotatable cover 120, the arc-shaped wall 111 can be mated with the first through groove 124, and the engaging hook 113 is engaged with the engaging hole 125.

Figure 5:
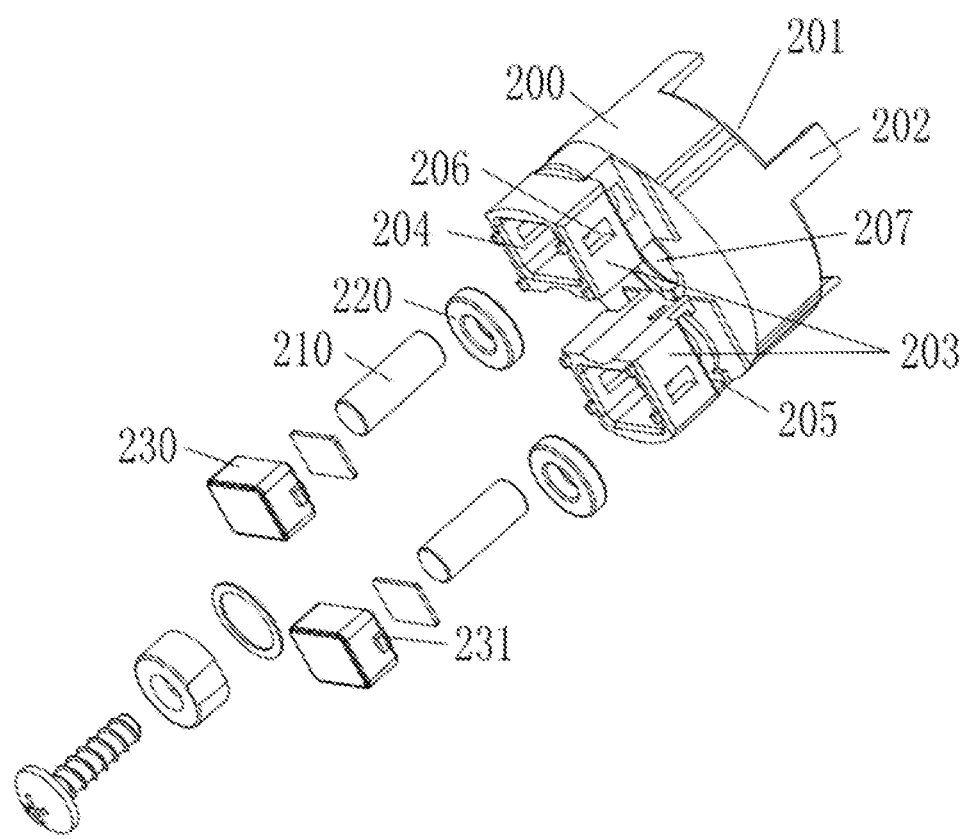
Figure 8:
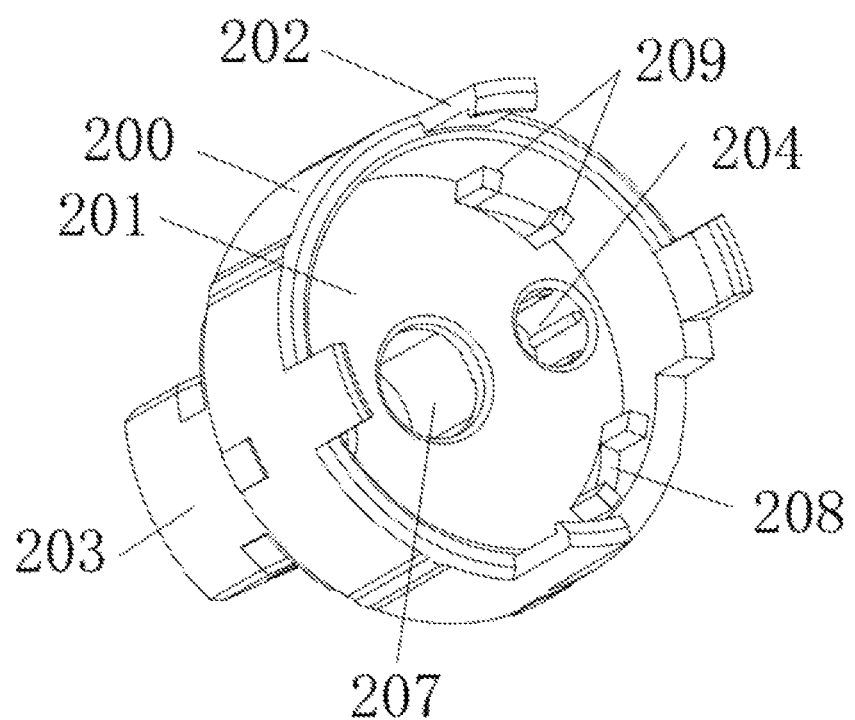
FIG. 8 is a schematic view of a three-dimensional structure of a mounting frame in FIG. 5.

The mounting frame 200:

As shown in FIGS. 5 and 8, a first receiving groove 201 is provided on one end surface of the mounting frame 200, and a first mating surface 208 inclined relative to a circumferential direction of the first receiving groove 201 may be provided on an inner side surface of the first receiving groove 201. The first mating surface 208 may face an opening end of the first receiving groove 201. Four sets of limiting structures may be provided on the inner side surface of the first receiving groove 201 in the circumferential direction, and each set of limiting structure may include two limiting ribs 209. The first mating surface 208 may be disposed between the two limiting ribs 209 in each set. Connecting hooks 202 may also be provided on an outer end surface of the first receiving groove 201 at intervals in the circumferential direction. FIG. 8 illustrates an example in which four connecting hooks 202 are provided. However, the number of connecting hooks 202 may be set as required, which is not limited in this embodiment. Two eccentrically arranged mating bosses 203 protrude from the other end surface of the mounting frame 200. The two mating bosses 203 may be located in the same row and may both be configured as T-shaped mating bosses. The end surfaces of the two mating bosses 203 may be provided with through receiving holes 204 which may communicate with the first receiving groove 201. Sockets 205 may be provided at neck portions of the two mating bosses 203 connected with a groove wall of the first receiving groove 201. The socket 205 may communicate with the receiving hole 204, and the two sockets 205 may face oppositely. A guide hole 206 may also be provided on a side wall of the receiving hole 204. A penetrating hole 207 may be provided between the two mating bosses 203, and a first transmission structure may include the first mating surface 208.

As shown in FIG. 5, a transmission shaft 210, a roller 220 and a locking member 230 may be mounted in the receiving hole 204. A second transmission structure may be the transmission shaft 210. The transmission shaft 210 may be a cylindrical shaft. The roller 220 may be a ring-shaped roller 220. The locking member 230 may be a cubic damping block, and a side surface of the damping block may be provided with a guide post 231. In this embodiment, the shapes of the transmission shaft 210, the roller 220 and the locking member 230 are not limited.

Figure 4:
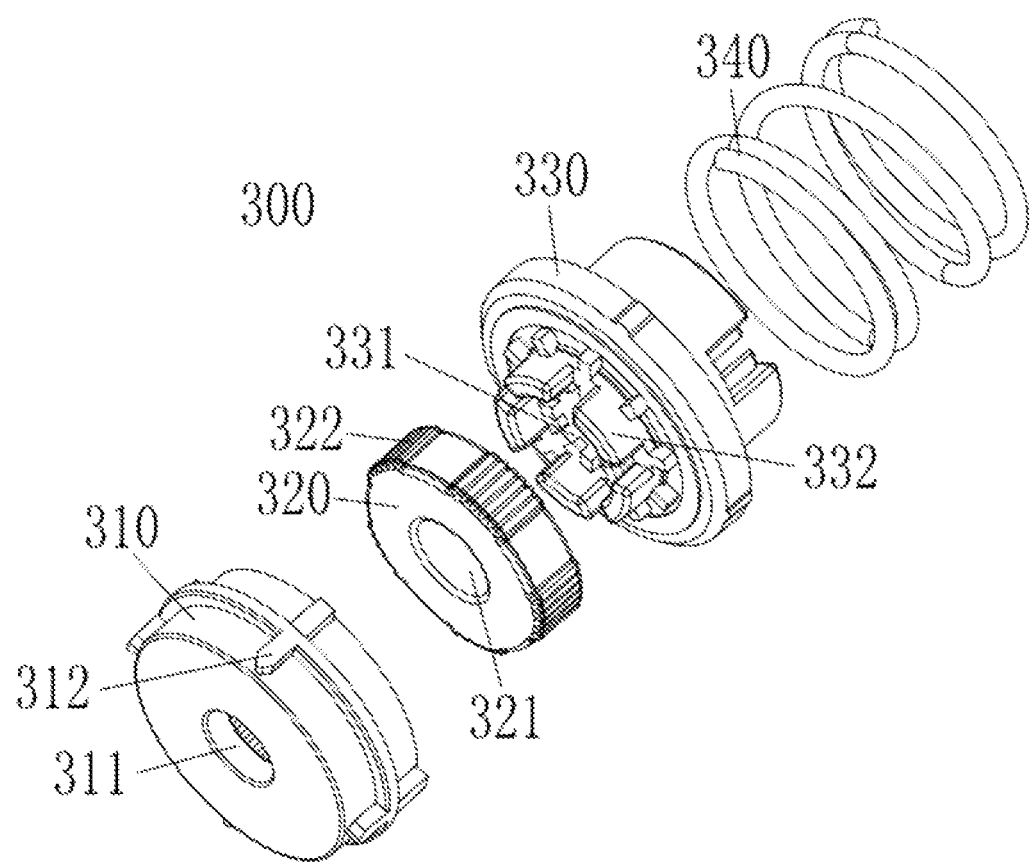
Figure 6:
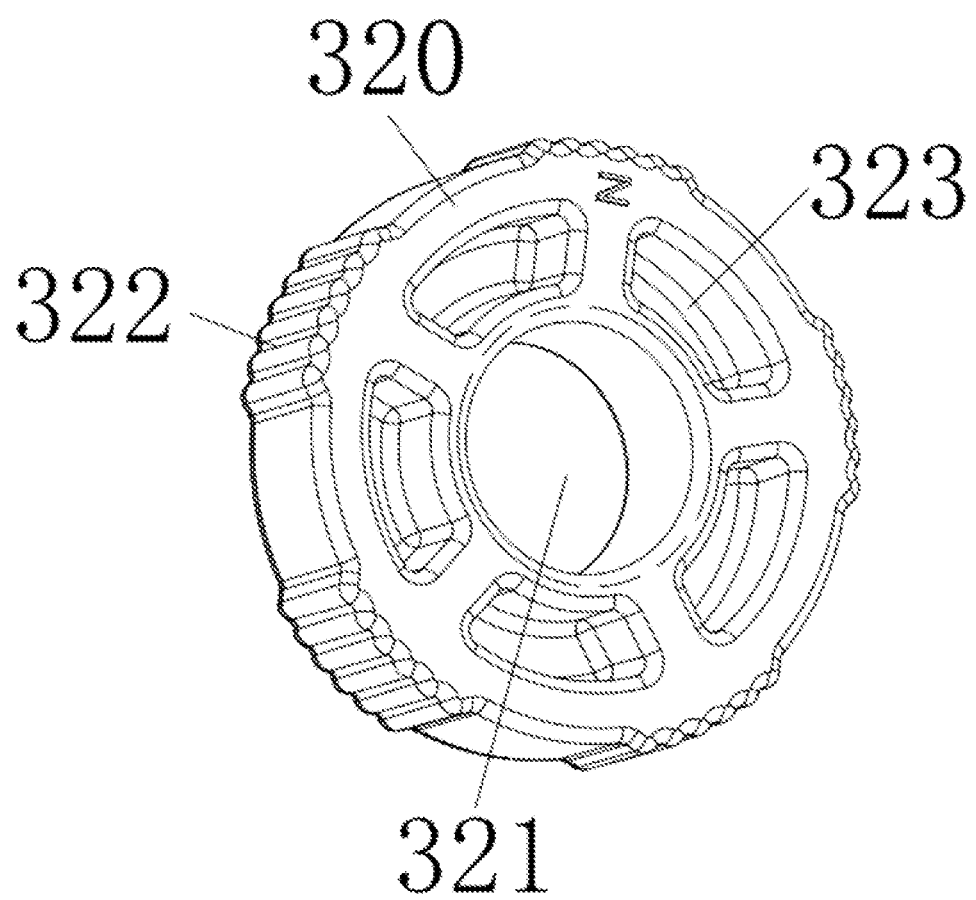
FIG. 6 is a schematic view of a three-dimensional structure of a rubber roller in FIG. 4.
Figure 7:
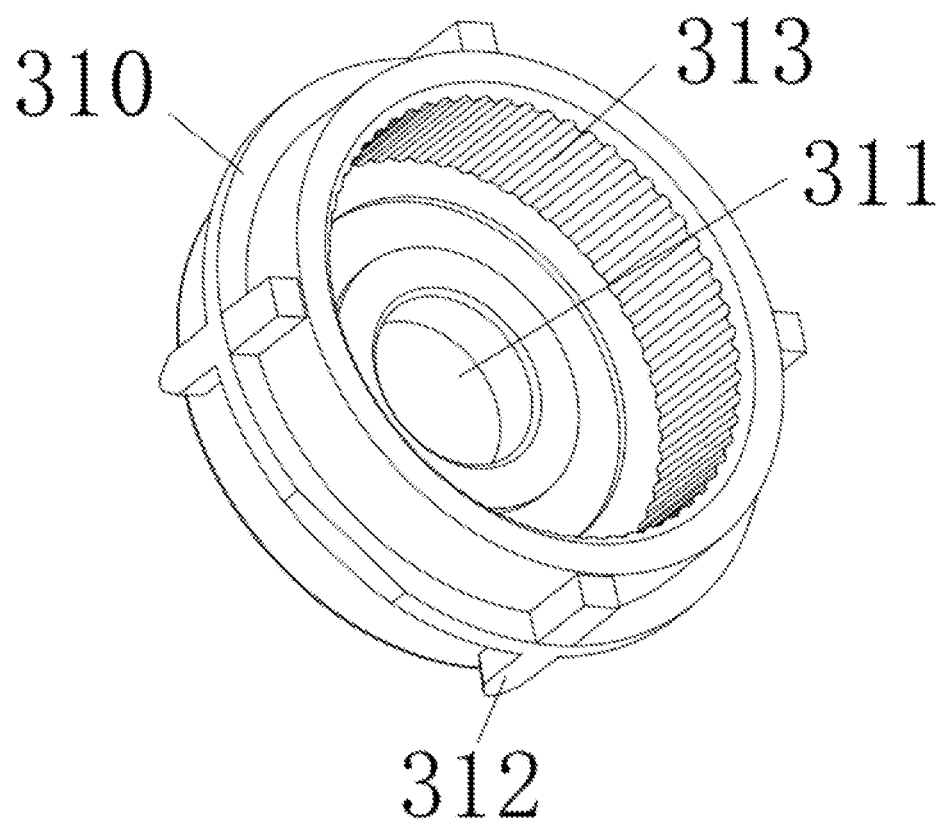
FIG. 7 is a schematic view of a three-dimensional structure of a transmission seat in FIG. 4.

The transmission assembly 300:

As shown in FIGS. 4, 6 and 7, the transmission assembly 300 may include a transmission seat 310, a rubber roller 320, a support 330 and an elastic member 340.

As shown in FIGS. 4 and 7, the transmission seat 310 may be barrel-shaped, a top wall of the transmission seat 310 may be provided with a first through hole 311, an outer side surface of the transmission seat 310 may be provided with convex ribs 312, the first transmission structure may also include convex ribs 312, and an inner side surface of the transmission seat 310 may be provided with a wave-shaped toothed groove 313.

As shown in FIGS. 4 and 6, a second through hole 321 may be provided in a center portion of the rubber roller 320, engaging grooves 323 may be provided on one end surface of the rubber roller 320, and damping ribs 322 may be convexly provided on an outer side surface of the rubber roller 320.

As shown in FIG. 4, a third through hole 331 may be provided in a center portion of one end surface of the support 330, and a guiding and positioning hole (not shown) may be provided beside the third through hole 331. The guiding and positioning hole may be mated with the guiding and positioning upright rib 123. The other end surface of the support 330 may be provided with engaging teeth 332.

As shown in FIG. 4, the elastic member 340 may be a coil spring, and the implementation form of the elastic member 340 is not limited in this embodiment.

The assembly structure of the movable holder:

As shown in FIGS. 2 to 8, the arc-shaped wall 111 extends into the first through groove 124, and the engaging hook 113 snaps into the engaging hole 125 to assemble the showerhead seat 110 with the rotatable cover 120. A showerhead may be fixed inside the arc-shaped wall 111. The engaging teeth 332 are mated with the engaging grooves 323, and by an interference fit between the damping ribs 322 and the toothed grooves 313, the transmission seat 310, the rubber roller 320 and the support 330 are assembled together to form an assembly 1. After the assembly, the rubber roller 320 is located in the transmission seat 310. The assembly 1 is mounted into the first receiving groove 201, so that the convex rib 312 extends between the limiting ribs 209 and abuts against the first mating surface 208, and the connecting hook 202 is snapped on the support 330, thus assembling the assembly 1 with the mounting frame 200 to form an assembly 2. The assembly 1 may rotate circumferentially and move axially in the mounting frame 200. The roller 220 is mounted into the receiving hole 204 through the socket 205, and the transmission shaft 210 is mounted into the receiving hole 204 and mounted on the roller 220 by passing therethrough. The locking member 230 is further mounted into the receiving hole 204, and the guide post 231 is slid into the guide hole 206 to realize movable mounting of the locking member 230 in the receiving hole 204. After the mounting, one end of the transmission shaft 210 contacts the locking member 230, and the other end of the transmission shaft 210 contacts an end surface of the transmission seat 310. The rotatable cover 120 is rotatably mounted on the mounting frame 200, the elastic member 340 is pressed between the assembly 1 and the bottom wall of the second receiving groove 121, the stud 122 is mounted in the first through hole 311, the second through hole 321 and the third through hole 331 by passing therethrough, and the guiding and positioning upright rib 123 is inserted into the guiding and positioning hole, so that the assembly 1 can rotate along with the rotatable cover 120 and move linearly along the guiding and positioning upright rib 123 during rotation. Finally, the assembly 2 may be assembled with the rotatable cover 120 by screwing a screw onto the stud 122 through the penetrating hole 207. The assembly mode of the assembly 2 and the rotatable cover 120 is not limited in this embodiment. The through holes may include the first through hole 311, the second through hole 321 and the third through hole 331.

The convex rib 312 may rotate only within a defined angle range between two limiting ribs 209, so that the rubber roller 320 may rotate relative to the transmission seat 310, causing the damping ribs 322 to jump along the toothed grooves 313, thereby realizing angle adjustment of the rotatable cover 120. The size of the preset angle range is related to the width between two limiting ribs 209.

A rod (not shown) may be provided to assist in fixing the mating boss 203. The rod may be provided with a guide rail groove, and the mating boss 203 may be mated with the guide rail groove of the rod. The guide rail groove may be configured as a T-shaped guide rail groove. The mounting frame 200 is operated as follows.

The rotatable cover 120 is rotated in a first rotation direction, and under the action of the elastic member 340, the convex rib 312 may slide from the higher end of the first mating surface 208 to the lower end of the first mating surface 208 and abut against a limiting rib 209. The assembly 1 moves towards the locking member 230 to push the transmission shaft 210, and the transmission shaft 210 pushes the locking member 230 to move towards the outside of the receiving hole 204, so that the locking member 230 presses the groove wall of the guide rail groove to lock the mounting frame 200. At this time, the mating boss 203 is fixed in the guide rail groove. The rotatable cover 120 is continuously driven to rotate in the first rotation direction, and the rubber roller 320 rotates synchronously with the rotatable cover 120. Within the preset angle range, the transmission seat 310 cannot rotate because it is in an extreme position (the convex rib 312 abuts against a limiting rib 209). At this time, the locking member 230 is in a locked state, and the movable holder is fixed, thus realizing the adjustment of the angle of the rotatable cover 120 in the first rotation direction. As shown in FIG. 8, the higher end of the first mating surface 208 is a relatively higher end of the first mating surface 208 that is higher than the surface of the first receiving groove 201, and the lower end of the first mating surface 208 is an end of the first mating surface 208 that is closer to the surface of the first receiving groove 201.

The rotatable cover 120 is rotated in a direction opposite to the first rotation direction against the action of the elastic member 340, the convex rib 312 may slide from the lower end of the first mating surface 208 to the higher end of the first mating surface 208 and abut against another limiting rib 209. The assembly 1 moves towards the rotatable cover 120 to release the transmission shaft 210, and the transmission shaft 210 releases the locking member 230, so that the locking member 230 releases the groove wall of the guide rail groove to unlock the mounting frame 200. At this time, the mating boss 203 can move in the guide rail groove. The rotatable cover 120 is continuously driven to rotate in the direction opposite to the first rotation direction. Within the preset angle range, the transmission seat 310 cannot rotate because it is in another extreme position (the convex rib 312 abuts against another limiting rib 209), and the rubber roller 320 rotates together with the rotatable cover 120 (and the support 330), thus realizing the adjustment of the angle of the rotatable cover 120 in the direction opposite to the first rotation direction.

In an example, the first mating surface 208 may be an inclined surface or a curved surface.

Alternatively, the convex rib 312 may be disposed on the inner surface of the first receiving groove 201, and the first mating surface 208 and the limiting ribs 209 may be disposed on the outer side surface of the transmission seat 310 (this scheme is not shown in the drawings), which may also achieve the objects of the present application, with the purpose not departing from the design idea of the present disclosure, and therefore will not be described in detail here, and should also fall within the protection scope of the present application.

Embodiment 2

This embodiment is distinguished from Embodiment 1 in that: the mating boss may be convexly disposed on the outer side surface of the mounting frame (this scheme is not shown in the drawings), a second mating surface inclined axially relative to the first receiving groove may be disposed on the side surface of the transmission assembly, and the second transmission structure may further include the second mating surface.

In an example, the second mating surface may be a side surface of truncated cone. It may be the case that the diameter of the second mating surface gradually increases from the end away from the rotatable cover to the end adjacent to the rotatable cover.

The mounting frame is operated as follows.

The rotatable cover is rotated in the first rotation direction, and under the action of the elastic member, the convex rib slides from the higher end of the first mating surface to the lower end of the first mating surface and abuts against a limiting rib. The assembly 1 moves away from the rotatable cover, the second mating surface pushes the transmission shaft, and the transmission shaft pushes the locking member to move towards the outside of the receiving hole, so that the locking member presses the groove wall of the guide rail groove to lock the mounting frame. At this time, the mating boss is fixed in the guide rail groove. The rotatable cover is continuously driven to rotate in the first rotation direction, and the rubber roller rotates synchronously with the rotatable cover. Within the preset angle range, the transmission seat cannot rotate because it is in an extreme position (the convex rib abuts against a limiting rib). At this time, the locking member is in the locked state, and the movable holder is fixed, thus realizing the adjustment of the angle of the rotatable cover in the first rotation direction.

The rotatable cover is rotated in the direction opposite to the first rotation direction against the elastic force of the elastic member, the convex rib slides from the lower end of the first mating surface to the higher end of the first mating surface and abuts against another limiting rib. The assembly 1 moves towards the rotatable cover, the second mating surface releases the transmission shaft, and the transmission shaft releases the locking member, so that the locking member releases the groove wall of the guide rail groove to unlock the mounting frame. At this time, the mating boss can move in the guide rail groove. The rotatable cover is continuously driven to rotate in the direction opposite to the first rotation direction. Within the preset angle range, the transmission seat cannot rotate because it is in another extreme position (the convex rib abuts against another limiting rib), and the rubber roller rotates together with the rotatable cover (and the support), thus realizing the adjustment of the angle of the rotatable cover in the direction opposite to the first rotation direction.

In an example, the second mating surface may be a side surface of truncated cone. Alternatively, it may be the case that the diameter of the second mating surface gradually decreases from the end away from the rotatable cover to the end adjacent to the rotatable cover.

The mounting frame is operated as follows:

The rotatable cover is rotated in the direction opposite to the first rotation direction against the action of the elastic member, the convex rib slides from the lower end of the first mating surface to the higher end of the first mating surface and abuts against a limiting rib. The assembly 1 moves towards the rotatable cover, the second mating surface releases the transmission shaft, and the transmission shaft releases the locking member, so that the locking member releases the groove wall of the guide rail groove to unlock the mounting frame. At this time, the mating boss can move in the guide rail groove. The rotatable cover is continuously driven to rotate in the direction opposite to the first rotation direction, and the rubber roller rotates synchronously with the rotatable cover. Within the preset angle range, the transmission seat cannot rotate because it is in an extreme position (the convex rib abuts against a limiting rib). At this time, the locking member is in the locked state, and the movable holder is fixed, thus realizing the adjustment of the angle of the rotatable cover in the direction opposite to the first rotation direction.

The rotatable cover is rotated in the first rotation direction, and under the action of the elastic force of the elastic member, the convex rib slides from the higher end of the first mating surface to the lower end of the first mating surface and abuts against another limiting rib. The assembly 1 moves away from the rotatable cover, the second mating surface pushes the transmission shaft, and the transmission shaft pushes the locking member to move towards the outside of the receiving hole, so that the locking member presses the groove wall of the guide rail groove to lock the mounting frame. At this time, the mating boss is fixed in the guide rail groove. The rotatable cover is continuously driven to rotate in the direction opposite to the first rotation direction. Within the preset angle range, the transmission seat cannot rotate because it is in another extreme position (the convex rib abuts against another limiting rib), and the rubber roller rotates together with the rotatable cover (and the support), thus realizing the adjustment of the angle of the rotatable cover in the first rotation direction.

Embodiment 3

A shower assembly (this scheme is not shown in the drawings) provided in Embodiment 3 of the present disclosure includes a fixed rod, a showerhead and the movable holder described in any of the above embodiments. The guide rail groove may be located on the fixed rod, and the showerhead is detachably mounted on the showerhead seat assembly.

The shower assembly has all the advantages of the movable holder provided by any of the above embodiments, which will not be described in detail here.

For example, a transmission fit can be formed between the movable holder and the groove wall of the guide rail groove by the roller to change sliding friction into rolling friction, so that the friction force between the movable holder and the guide rail groove is smaller and the sliding of the movable holder is smoother.

In an example, the guide rail groove is a T-shaped guide rail groove.

It may be the case that the showerhead seat assembly is driven to rotate in the direction opposite to the first rotation direction, the damping member rotates synchronously with the showerhead seat assembly, and the transmission seat rotates in linkage with the damping member at an extreme position within the preset angle range. At this time, the transmission seat drives the locking member to be unlocked from the locked state to an unlocked state, thus realizing the lifting adjustment of the movable holder. When the transmission seat rotates to the other extreme position within the preset angle range, the showerhead seat assembly is continuously rotated in the direction opposite to the first rotation direction. At this time, the transmission seat cannot continue to rotate, and the damping member and the showerhead seat assembly rotate together, thus realizing the adjustment of the angle of the showerhead in the direction opposite to the first rotation direction.

It may be the case that the showerhead seat assembly is driven to rotate in the first rotation direction, the damping member rotates synchronously with the showerhead seat assembly, and the transmission seat cannot rotate because it is in an extreme position within the preset angle range. At this time, the locking member is in the locked state, and the movable holder is fixed, thus realizing the adjustment of the angle of the showerhead in the first rotation direction.

In the description of the present disclosure, it should be noted that the orientation or position relationships indicated by the terms "upper", "lower", "one side", "the other side", "one end", "the other end", "side", "relative" and "periphery" or the like are based on the orientation or position relationships shown in the drawings, which are only for convenience of describing the embodiments of the present disclosure and simplifying the description, rather than indicating or implying that the structure referred has the specific orientation, and is constructed and operated in the specific orientation, and thus cannot be interpreted as a limitation on the embodiments of the present disclosure.

In the description of the embodiments of the present disclosure, unless otherwise clearly specified and limited, the terms "connection", "direct connection", "indirect connection", "fixed connection", "mounting" and "assembly" should be understood in a broad sense, for example, they may be fixed connection, detachable connection or integrated connection; and the terms "mounting", "connection" and "fixed connection" may be direct connection, or indirect connection through an intermediary, or may be an internal communication between two elements. For those of ordinary skills in the art, the meanings of the above terms in the embodiments of the present disclosure can be understood according to specific situations.

Although implementations disclosed herein are described above, the described contents are only implementations adopted for facilitating understanding of the present application, and are not intended to limit the present application. Without departing from the spirit and scope disclosed herein, any person skilled in the art to which the present application pertains may make any modifications and changes in the form and details of implementation, but the scope of patent protection of the present application shall still be defined by the appended claims.

What is claimed is:

1. A movable holder, comprising:
   a showerhead seat assembly;
   a mounting frame having a first receiving groove, the showerhead seat assembly being rotatably mounted on the mounting frame, a mating boss being provided on the mounting frame, and a locking member being mounted on the mating boss;
   a transmission seat movably mounted in the first receiving groove, a limiting structure being provided between the mounting frame and the transmission seat; and
   a damping member sleeved with the transmission seat in a relatively rotatable manner and rotated synchronously with the showerhead seat assembly, and an elastic member being pressed between the damping member and the showerhead seat assembly;
   wherein the transmission seat is configured to drive, along with the rotation of the damping member, the locking member to move between a locked position and an unlocked position;
   the transmission seat is restricted by the limiting structure to be rotatable only within a preset angle range, and the damping member is rotated relative to the transmission seat when rotating beyond the preset angle range.

2. The movable holder according to claim 1, further comprising:
   a first transmission structure provided between the mounting frame and the transmission seat, and a second transmission structure provided between the locking member and the transmission seat, the damping member being movably mounted on the showerhead seat assembly;

wherein the first transmission structure is configured to drive the transmission seat to move towards or away from the showerhead seat assembly when the transmission seat rotates with the damping member;

the second transmission structure is configured to drive the locking member to move between the locked position and the unlocked position when the transmission seat moves towards or away from the showerhead seat assembly.

3. The movable holder according to claim 2, wherein limiting ribs are provided on an inner side surface of the first receiving groove at intervals in a circumferential direction, a convex rib is provided on a side surface of the transmission seat, the convex rib is limited between the limiting ribs, and the limiting structure comprises the limiting ribs.

4. The movable holder according to claim 2, wherein a convex rib is provided on a side surface of the transmission seat, a first mating surface inclined relative to a circumferential direction is provided on an inner side surface of the first receiving groove, the first mating surface faces an opening end of the first receiving groove, the convex rib abuts against the first mating surface, and the first transmission structure comprises the convex rib and the first mating surface;

when the convex rib rotates from a lower end of the first mating surface to a higher end of the first mating surface, the transmission seat moves towards the showerhead seat assembly;

when the convex rib rotates from the higher end of the first mating surface to the lower end of the first mating surface, the transmission seat moves away from the showerhead seat assembly.

5. The movable holder according to claim 2, further comprising:

a transmission shaft, a through receiving hole being provided on the mating boss, the locking member and the transmission shaft being both located in the receiving hole, one end of the transmission shaft being mated with the locking member, and the other end of the transmission shaft extending into the first receiving groove to be mated with the transmission seat, and the second transmission structure comprising the transmission shaft.

6. The movable holder according to claim 5, wherein the mating boss is convexly disposed on an end surface of the mounting frame facing away from the showerhead seat assembly;

when the transmission seat moves away from the showerhead seat assembly, an end surface of the transmission seat facing away from the showerhead seat assembly pushes the transmission shaft, and the transmission shaft pushes the locking member to move to the locked position;

when the transmission seat moves towards the showerhead seat assembly, the end surface of the transmission seat facing away from the showerhead seat assembly releases the transmission shaft, the transmission shaft releases the locking member, and the locking member moves to the unlocked position.

7. The movable holder according to claim 5, wherein the mating boss is convexly disposed on an outer side surface of the mounting frame, a second mating surface inclined relative to an axial direction is provided on a side surface of the transmission seat, the second mating surface faces an inner side surface of the first receiving groove, and the second transmission structure further comprises the second mating surface;

when the transmission seat moves towards or away from the showerhead seat assembly, the second mating surface pushes or releases the transmission shaft.

8. The movable holder according to claim 1, further comprising:

a roller rotatably mounted on the mating boss and configured to realize a rolling fit between the mating boss and a guide rail groove used in cooperation with the mating boss.

9. The movable holder according to claim 8, wherein a receiving hole is provided on the mating boss, a socket is provided on a side wall of the receiving hole, a transmission shaft is disposed in the receiving hole, and the roller is mounted into the receiving hole through the socket and rotatably sleeved on the transmission shaft.

10. The movable holder according to claim 1, further comprising:

a support located in the first receiving groove, the elastic member being pressed between the support and the showerhead seat assembly, the damping member being fixedly mounted on the support, and the transmission seat being rotatably covered and mounted on the damping member in an interference fit.

11. The movable holder according to claim 10, wherein a guiding and positioning hole is provided on an end surface of the support facing the showerhead seat assembly, and a guiding and positioning upright rib is convexly provided on the showerhead seat assembly, the guiding and positioning upright rib is inserted into the guiding and positioning hole;

through holes are provided in center portions of the transmission seat, the damping member and the support, a stud is convexly provided on the showerhead seat assembly, the stud extends into the through holes, and a screw passes through a top wall of the first receiving groove to be screwed on the stud.

12. The movable holder according to claim 1, wherein a second receiving groove is provided on the showerhead seat assembly, and the mounting frame is mounted in the second receiving groove in a sinking manner;

the mating boss is a T-shaped mating boss, and there are a plurality of sets of T-shaped mating bosses and locking members arranged at intervals in the same row;

the showerhead seat assembly comprises a showerhead seat and a rotatable cover, the rotatable cover is rotatably mounted on the mounting frame, and the showerhead seat is mounted on the rotatable cover;

the damping member is a rubber roller.

13. A shower assembly, comprising the movable holder according to claim 1.

14. The movable holder according to claim 2, further comprising:

a roller rotatably mounted on the mating boss and configured to realize a rolling fit between the mating boss and a guide rail groove used in cooperation with the mating boss.

15. The movable holder according to claim 3, further comprising:

a roller rotatably mounted on the mating boss and configured to realize a rolling fit between the mating boss and a guide rail groove used in cooperation with the mating boss.

16. The movable holder according to claim 4, further comprising:

a roller rotatably mounted on the mating boss and configured to realize a rolling fit between the mating boss and a guide rail groove used in cooperation with the mating boss.

17. The movable holder according to claim 5, further comprising:
a roller rotatably mounted on the mating boss and configured to realize a rolling fit between the mating boss and a guide rail groove used in cooperation with the mating boss.

18. The movable holder according to claim 6, further comprising:
a roller rotatably mounted on the mating boss and configured to realize a rolling fit between the mating boss and a guide rail groove used in cooperation with the mating boss.

19. The movable holder according to claim 7, further comprising:
a roller rotatably mounted on the mating boss and configured to realize a rolling fit between the mating boss and a guide rail groove used in cooperation with the mating boss.

20. The movable holder according to claim 2, further comprising:
a support located in the first receiving groove, the elastic member being pressed between the support and the showerhead seat assembly, the damping member being fixedly mounted on the support, and the transmission seat being rotatably covered and mounted on the damping member in an interference fit.

* * * * *